United States Patent
Hashimoto et al.

(10) Patent No.: US 10,220,834 B2
(45) Date of Patent: Mar. 5, 2019

(54) CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Hiroto Hashimoto, Atsugi (JP); Hiroaki Kimura, Toyota (JP); Tomohito Ono, Susono (JP); Takuya Iguchi, Susono (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 1 day.

(21) Appl. No.: 15/661,114

(22) Filed: Jul. 27, 2017

(65) Prior Publication Data
US 2018/0029590 A1    Feb. 1, 2018

(30) Foreign Application Priority Data
Jul. 29, 2016  (JP) .................. 2016-149897

(51) Int. Cl.
*B60W 20/40* (2016.01)
*B60K 6/26* (2007.10)
(Continued)

(52) U.S. Cl.
CPC .............. *B60W 20/40* (2013.01); *B60K 6/26* (2013.01); *B60K 6/387* (2013.01); *B60K 6/40* (2013.01); *B60W 10/02* (2013.01); *B60W 10/06* (2013.01); *B60W 10/08* (2013.01); *B60W 20/10* (2013.01); *F16D 27/00* (2013.01); *B60K 2006/268* (2013.01); *B60W 2710/083* (2013.01);
(Continued)

(58) Field of Classification Search
CPC . B60K 6/26; B60K 6/387; B60K 6/40; B60K 2006/268; B60W 10/02; B60W 10/06; B60W 10/08; B60W 20/10; B60W 20/40; B60W 2710/083; B60Y 2200/92; B60Y 2300/192; B60Y 2300/42; B60Y 2300/43; B60Y 2300/63; B60Y 2400/404; F16D 27/00; Y10S 903/906; Y10S 903/914; Y10S 903/93; Y10S 903/951
See application file for complete search history.

(56) References Cited

U.S. PATENT DOCUMENTS 9,145,930 B2 * 9/2015 Ebuchi .................. F16D 27/112
9,963,148 B2 * 5/2018 Hashimoto ............... B60K 6/26
(Continued)

FOREIGN PATENT DOCUMENTS

JP    H11-240350 A    9/1999
JP    2009-120043 A   6/2009
(Continued)

*Primary Examiner* — Rachid Bendidi
(74) *Attorney, Agent, or Firm* — Hunton Andrews Kurth LLP

(57) ABSTRACT

A control system for a hybrid vehicle configured to promptly disengage a clutch for halting an engine is provided. A clutch device comprises a reciprocating member having tapered reciprocating teeth, and a rotary member having tapered teeth opposed to the tapered rotary teeth. A controller is configured to turn off an actuator to eliminate the electromagnetic attraction thereby allowing the engine to be started, and to apply a torque of the first motor to the clutch device after the actuator is turned off thereby disengaging the reciprocating teeth from the rotary teeth.

6 Claims, 5 Drawing Sheets

(51) Int. Cl.
*B60K 6/387* (2007.10)
*B60K 6/40* (2007.10)
*B60W 10/02* (2006.01)
*B60W 10/06* (2006.01)
*B60W 10/08* (2006.01)
*B60W 20/10* (2016.01)
*F16D 27/00* (2006.01)

(52) U.S. Cl.
CPC ..... *B60Y 2200/92* (2013.01); *B60Y 2300/192* (2013.01); *B60Y 2300/42* (2013.01); *B60Y 2300/43* (2013.01); *B60Y 2300/63* (2013.01); *B60Y 2400/404* (2013.01); *Y10S 903/906* (2013.01); *Y10S 903/914* (2013.01); *Y10S 903/93* (2013.01); *Y10S 903/951* (2013.01)

(56) References Cited

U.S. PATENT DOCUMENTS

2015/0142232 A1  5/2015  Tabata et al.
2015/0267761 A1*  9/2015  Yoshimura .............. F16D 13/52
                                                          180/249
2015/0354643 A1  12/2015  Ebuchi et al.
2017/0267246 A1  9/2017  Hashimoto et al.

FOREIGN PATENT DOCUMENTS

| JP | 2010270898 A1 * | 2/2010 |
| JP | 2015148280 A1 * | 8/2015 |
| JP | 2015-232356 A | 12/2015 |
| JP | 2017-166536 A | 9/2017 |
| WO | 2013-128587 A1 | 9/2013 |
| WO | 2014-109036 A1 | 7/2014 |

* cited by examiner

CONTROL SYSTEM FOR HYBRID VEHICLE

CROSS REFERENCE TO RELATED APPLICATIONS

The present disclosure claims the benefit of priority to Japanese Patent Application No. 2016-149897 filed on Jul. 29, 2016 with the Japanese Patent Office, the entire contents of which are incorporated herein by reference in its entirety.

BACKGROUND

Field of the Disclosure

Embodiments of the present disclosure relate to the art of a control system for a hybrid vehicle that can be powered only by a motor while stopping an engine, and especially for a hybrid vehicle having a clutch for stopping a rotation of an input element of a power distribution device.

Discussion of the Related Art

JP-A-2009-120043 describes a drive unit for a hybrid vehicle having an engine, a first motor and a second motor, and a single-pinion planetary gear unit for distributing torque of the first motor to the engine and to the drive wheels. According to the teachings of JP-A-2009-120043, in the planetary gear unit, a carrier is connected to the engine, a sun gear is connected to the first motor, and a ring gear is connected to an output member for delivering power to the drive wheels. In the drive unit taught by JP-A-2009-120043, an operating mode can be selected from an electric mode in which the vehicle is powered at least by one of the first motor and the second motor while stopping the engine, a regeneration mode in which at least one of the first motor and the second motor is operated as a generator to translate a kinetic power of the vehicle into an electric power, and an engine mode in which the vehicle is powered by the engine. In order to halt a rotation of the engine during propulsion in the electric mode, the drive unit taught by JP-A-2009-120043 is provided with a dog clutch serving as a locking device.

JP-A-H11-240350 describes a vehicular starting assist device. In the starting assist device taught by JP-A-H11-240350, an axial draft is formed on each tooth of a dog clutch that is actuated by a solenoid. According to the teachings of JP-A-H11-240350, the solenoid includes a rod that is withdrawn in an axial direction of a coil against an elastic force of a spring when the coil is energized. A sleeve is fitted with an outer circumference of a movable dog of the dog clutch, and a fork is engaged with the sleeve to be reciprocated together with the rod. When current supply to the coil is stopped, the sleeve is pushed away from the actuator by the elastic force of the spring and a component of contact pressure acting between the teeth of the dog clutch on which the axial draft is individually formed.

In the starting assist device taught by JP-A-H11-240350, the solenoid may be modified to electromagnetically actuate an armature formed integrally with the movable dog to engage the dog clutch. In this case, a current required to establish a magnetic attraction can be reduced by reducing a distance (or a gap) between the armature and the coil or a yoke. However, if the armature and the coil or the yoke are situated too close, the magnetic attraction may remain the armature and the coil or the yoke even after stopping current supply to the solenoid. For this reason, a response of the clutch to be disengaged to allow the engine to rotate may be impaired when starting the engine.

SUMMARY

Aspects of embodiments of the present disclosure have been conceived noting the foregoing technical problems, and it is therefore an object of the present disclosure is to provide a control system for a hybrid vehicle configured to promptly disengage a dog clutch for stopping a rotation of an input element of a power distribution device.

Embodiment of the present disclosure relates to a control system for a hybrid vehicle, comprising: a power distribution device that performs a differential action among an input element, an output element and a reaction element; an engine that is connected to the input element; a first motor that is connected to the reaction element; a second motor that is connected to the output element; a clutch device including a brake member that selectively stops a rotation of the input element, and a controller that controls the engine, the first motor, the second motor and the clutch device. The clutch device further includes: a reciprocating member; a rotary member that is arranged coaxially with the reciprocating member; reciprocating teeth formed on the reciprocating member in which a thickness of each tooth is individually reduced toward the rotary member; rotary teeth formed on the rotary member in which a thickness of each tooth is individually reduced toward the reciprocating member; and an electromagnetic actuator that generates an electromagnetic attraction to attract the reciprocating teeth toward the rotary teeth. The controller is configured to crank the engine by the first motor. In order to achieve the above-explained objective, the controller is further configured to turn off the electromagnetic actuator to eliminate the electromagnetic attraction thereby allowing the engine to be started, and to apply a torque of the first motor to the clutch device after the electromagnetic actuator is turned off thereby disengaging the reciprocating teeth from the rotary teeth.

In a non-limiting embodiment, the controller is further configured to apply the torque of the first motor to the clutch device in a same direction as a torque of the engine.

In a non-limiting embodiment, the reciprocating member may be returned to an original position at which the reciprocating teeth are disengaged from the rotary teeth when the electromagnetic actuator is turned off, and the reciprocating member may be attracted to the rotary teeth to be engaged therewith by the electromagnetic attraction of the electromagnetic actuator. In addition, the controller may be further configured to change the torque of the first motor depending on a travel distance of the reciprocating teeth from the original position toward the rotary teeth in a case that the electromagnetic actuator has been turned off and the condition to start the engine is satisfied.

In a non-limiting embodiment, the controller may be further configured to: select a target value of the torque of the first motor from at least a first target torque to crank the engine, and a second target torque to be applied to the clutch device to disengage the clutch device that is greater than the first target torque; and change the torque of the first motor to achieve the first target torque when the travel distance of the reciprocating teeth from the original position toward the rotary teeth is smaller than the threshold value, and to achieve the second target torque when the travel distance of the reciprocating teeth from the original position toward the rotary teeth is equal to or greater than the threshold value.

In a non-limiting embodiment, the electromagnetic actuator may include: a coil that generates an electromagnetic attraction when energized; a yoke holding the coil therein; an armature that is disposed coaxially with the yoke to be electromagnetically attracted to the yoke by the electromagnetic attraction generated by the coil; and a return spring that pushes the armature away from the yoke.

In a non-limiting embodiment, the controller may be further configured to generate a torque by the second motor in a direction to cancel the torque of the first motor.

Thus, according to the embodiment of the present disclosure, the torque of the first motor is applied to the clutch device if the electromagnetic actuator has been turned off and the condition to start the engine is satisfied. Consequently, the reciprocating teeth of the reciprocating member are disengaged from the rotary teeth by a component of reaction force against the torque applied to the rotary member from the first motor. According to the embodiment of the present disclosure, therefore, the clutch device can be disengaged promptly by the torque of the first motor even if the electromagnetic attraction is not eliminated immediately after turning off the actuator. Consequently, the engine is allowed to be started promptly.

Specifically, in order to disengage the clutch device after turning off the electromagnetic actuator, the first motor generates the torque in the same direction as the engine torque. According to the embodiment of the present disclosure, therefore, the engine can be cranked promptly and smoothly after disengaging the clutch device by applying the torque of the first motor to the rotary member of the clutch device.

More specifically, the torque of the first motor is adjusted to the first target torque that is smaller than the second target torque if the travel distance of the reciprocating teeth from the original position toward the rotary teeth is smaller than the threshold value, that is, the clutch device has already been disengaged. According to the embodiment of the present disclosure, therefore, a rotational speed of the engine 1 will not be raised promptly. For this reason, an increase in an inertia torque and resultant drop in a drive force can be prevented. By contrast, the torque of the first motor is adjusted to the second target torque if the travel distance of the reciprocating teeth from the original position toward the rotary teeth is equal to or greater than the threshold value, that is, the clutch device is still in engagement. According to the embodiment of the present disclosure, therefore, the clutch device can be disengaged promptly after turning off the actuator.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
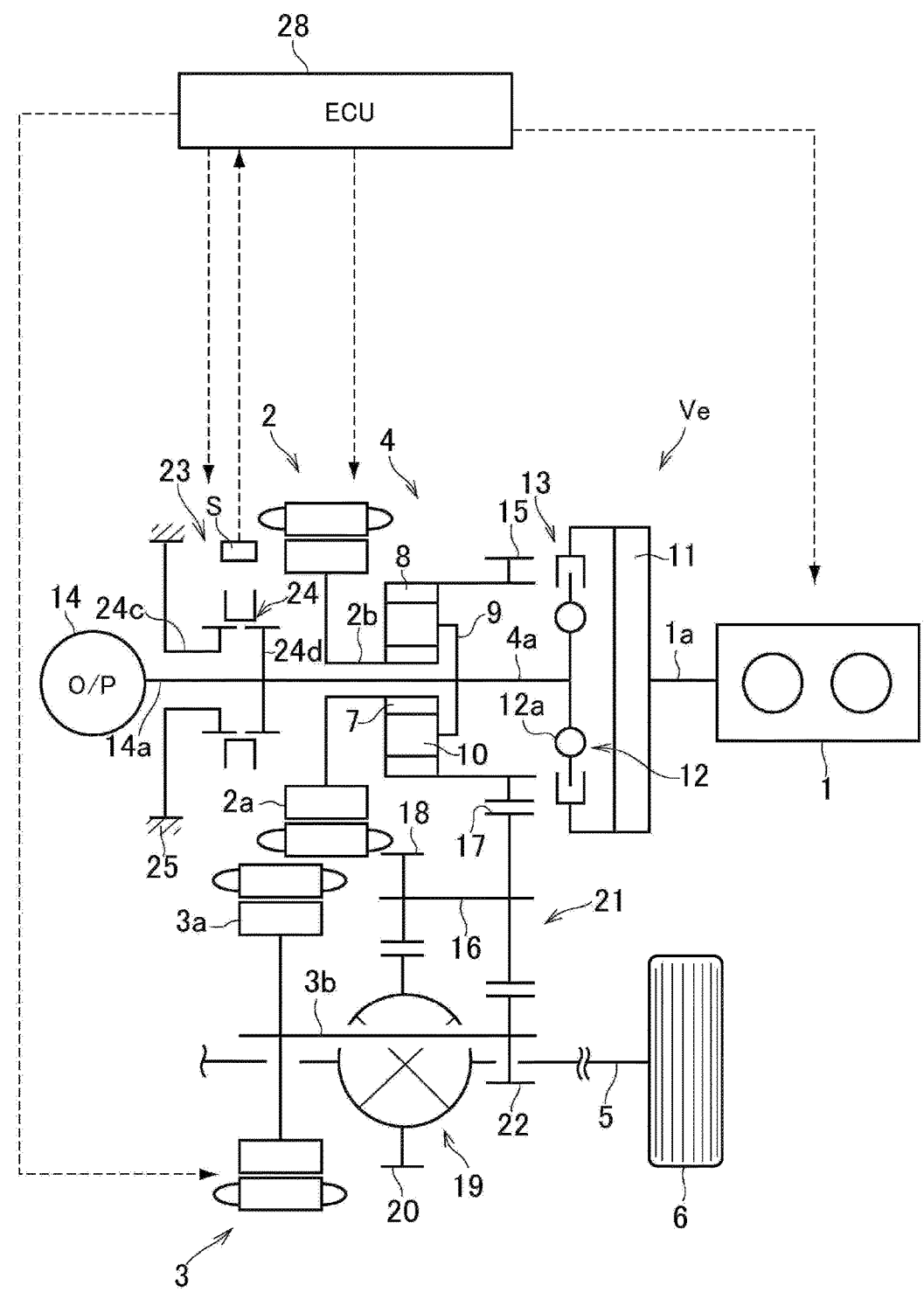
FIG. 1 is a schematic illustration showing one example of a power transmission unit of the hybrid vehicle according to the present disclosure.

Embodiments of the present disclosure will now be explained with reference to the accompanying drawings. Referring now to FIG. 1, there is shown one example of a power transmission unit of a hybrid vehicle Ve to which the control system according to the embodiment of the present disclosure is applied. In FIG. 1, dashed-lines indicate electrical connections. A prime mover of the hybrid vehicle Ve shown in FIG. 1 includes an engine (referred to as "ENG" in FIG. 1) 1, a first motor (referred to as "MG1" in FIG. 1) 2, and a second motor (referred to as "MG2" in FIG. 1) 3. An output power of the engine 1 is distributed to the first motor 2 and to a driveshaft 5 through a power distribution device 4, and the second motor 3 can be driven as a motor by an electric power generated by the first motor 2 to rotate the driveshaft 5 and drive wheels 6.

The power distribution device 4 is a single-pinion planetary gear unit comprising a sun gear 7 as a reaction element, a ring gear 8 as an output element and a carrier 9 as an input element, and arranged coaxially between the engine 1 and the first motor 2 to deliver torque to the drive wheels 6. In the power distribution device 4, the ring gear 8 as an internal gear is situated around the sun gear 7, and a plurality of pinion gears 10 interposed between the sun gear 7 and the ring gear 8 are supported by the carrier 9 while being allowed to rotate and revolve around the sun gear 7. Alternatively, a double-pinion planetary gear unit or a Ravigneaux planetary gear unit may also be used as the power distribution device 4.

In the power distribution device 4, specifically, the carrier 9 is connected to an input shaft 4a that is also connected to an output shaft 1a of the engine 1 through a flywheel 11 having a damper device 12 and a first torque limiter 13. In other words, the output shaft 1a of the engine 1 is connected to the carrier 9 of the power distribution device 4 through the flywheel 11, the damper device 12 and the first torque limiter 13.

Thus, the flywheel 11 is interposed between the output shaft 1a of the engine 1 and the input shaft 4a of the power distribution device 4, and the damper device 12 is attached to the flywheel 11 on the other side of the output shaft 1a of the engine 1 (i.e., to the left side in FIG. 1). The damper device 12 is adapted to absorb torsional vibrations on the output shaft 1a resulting from torque pulse of the engine 1 elastically by a damper spring(s) 12a.

In order to restrict a magnitude of the torque transmitted between the engine 1 and the drive wheels 6, the first torque limiter 13 is arranged around the damper device 12. In the first torque limiter 13, friction plates (not shown) individually connected to the output shaft 1a through the flywheel 11 and a friction plate (not shown) connected to the input shaft 4a through the damper device 12 are elastically pushed by a diaphragm spring (not shown) to be brought into engagement. In the first torque limiter 13, a friction force acting among the friction plates is governed by an elastic force of the diaphragm spring. That is, an upper limit value of the torque transmittable through the first torque limiter 13 can be adjusted by adjusting a constant of the diaphragm spring.

The first motor 2 is disposed on the opposite side of the engine 1 across the power distribution device 4 (i.e., on the left side in FIG. 1), and the sun gear 7 of the power distribution device 4 is connected to a hollow rotor shaft 2b rotated together with a rotor 2a of the first motor 2. A rotary shaft 14a of an oil pump 14 penetrates through the rotor shaft 2b and the sun gear 7 to be connected to the input shaft 4a.

A first drive gear 15 as an external gear is integrally formed around the ring gear 8 of the power distribution device 4, and a countershaft 16 is arranged in parallel with a common rotational axis of the power distribution device 4 and the first motor 2. A counter driven gear 17 is fitted onto one of end portions of the countershaft 16 (i.e., right side in FIG. 1) in such a manner as to be rotated integrally therewith while being meshed with the first drive gear 15. A counter drive gear (i.e., a final drive gear) 18 is fitted onto the other end portion of the countershaft 16 (i.e., left side in FIG. 1) in such a manner as to be rotated integrally therewith while being meshed with a differential ring gear (i.e., a final driven gear) 20 of a deferential gear unit 19 as a final reduction. Thus, the ring gear 8 of the power distribution device 4 is connected to the driveshaft 5 and the drive wheels 6 through the first drive gear 15, the countershaft 16, the counter driven gear 17, the counter drive gear 18, and an output gear train 21 having the differential ring gear 20.

In the power transmission unit of the vehicle Ve, an output torque of the second motor 3 can be added to the torque delivered from the power distribution device 4 to the driveshaft 5. To this end, a rotor 3a of the second motor 3 is connected to a rotor shaft 3b extending in parallel with the countershaft 16 to rotate integrally therewith, and a second drive gear 22 is fitted onto a leading end of the rotor shaft 3b to be rotated integrally therewith while being meshed with the counter driven gear 17. Thus, the ring gear 8 of the power distribution device 4 and the second motor 3 are individually connected to the driveshaft 5 through the output gear train 21 and the second drive gear 22.

The power transmission unit of the vehicle Ve is further provided with a clutch device 23 having a brake 24. As described later, the brake 24 may serve as a torque limiter. The clutch device 23 is brought into engagement by engaging reciprocating teeth 24a with rotary teeth 24b to stop a rotation of the carrier 9 of the power distribution device 4 or the output shaft 1a of the engine 1. The engagement of the clutch device 23 is cancelled when torque of the rotary teeth 24b exceeds an upper limit value thereby preventing the power transmission unit from being subjected to an excessive load.

Figure 2:
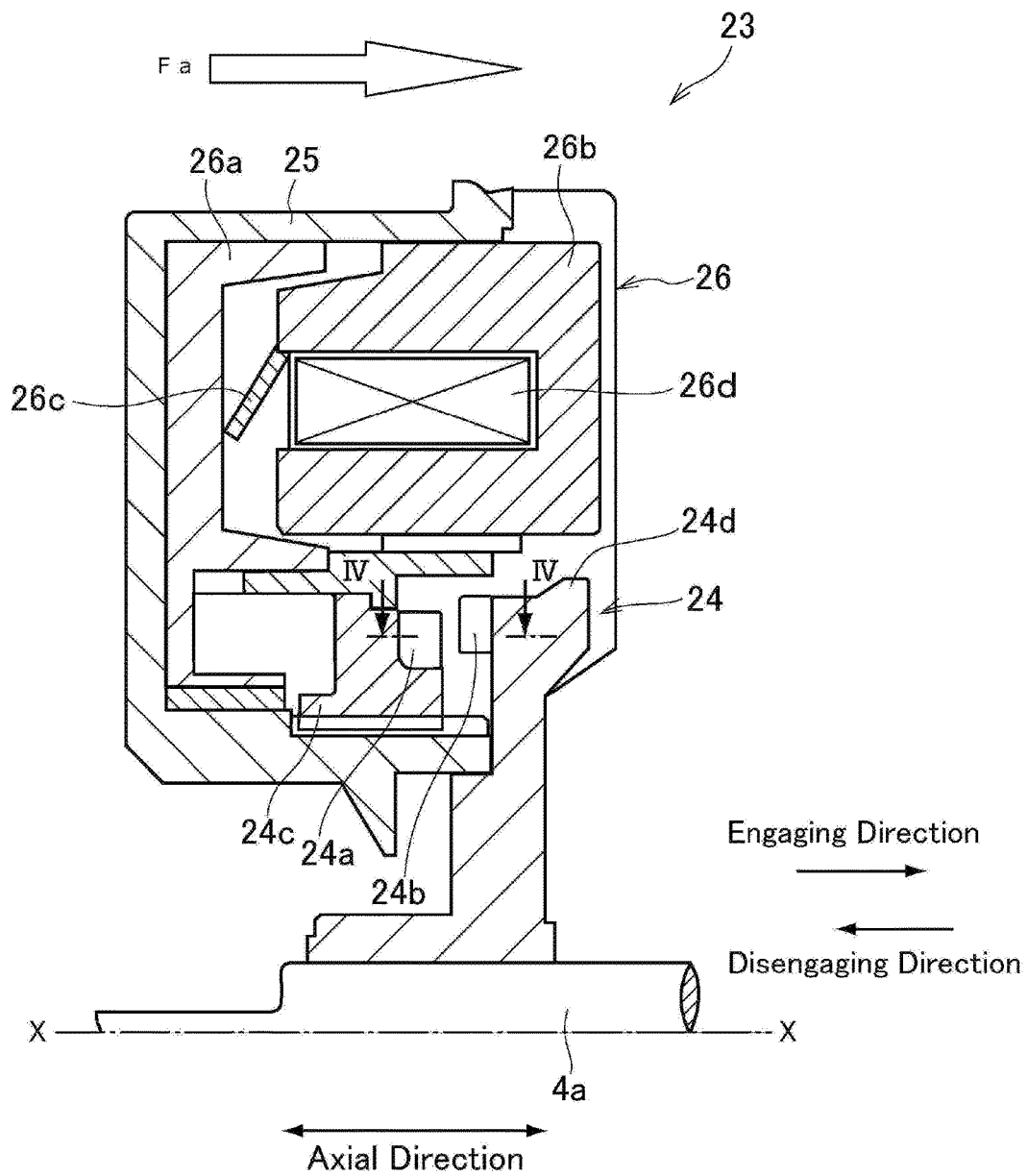
FIG. 2 is a cross-sectional view of the clutch device and the actuator.

In the power transmission unit shown in FIG. 1, the clutch device 23, the first motor 2, the second motor 3, the power distribution device 4, etc. are held in a transmission case 25, and the clutch device 23 is disposed between the transmission case 25 and the input shaft 4a or the carrier 9. As illustrated in FIG. 2, the brake member 24 comprises a reciprocating member 24c on which the reciprocating teeth 24a are formed, and a rotary member 24d as an annular member on which the rotary teeth 24b are formed. That is, the reciprocating teeth 24a are brought into engagement with the rotary teeth 24b by moving the reciprocating member 24c toward the rotary member 24d in an axial direction X of the input shaft 4a of the power distribution device 4.

Specifically, in the clutch device 23, the reciprocating member 24c is splined to the transmission case 25 while being restricted to rotate around the input shaft 4a but allowed to reciprocate in the axial direction X, and the rotary member 24d is fitted onto the input shaft 4a while being opposed to the reciprocating member 24c in such a manner as to be rotated integrally with the input shaft 4a.

Figure 3:
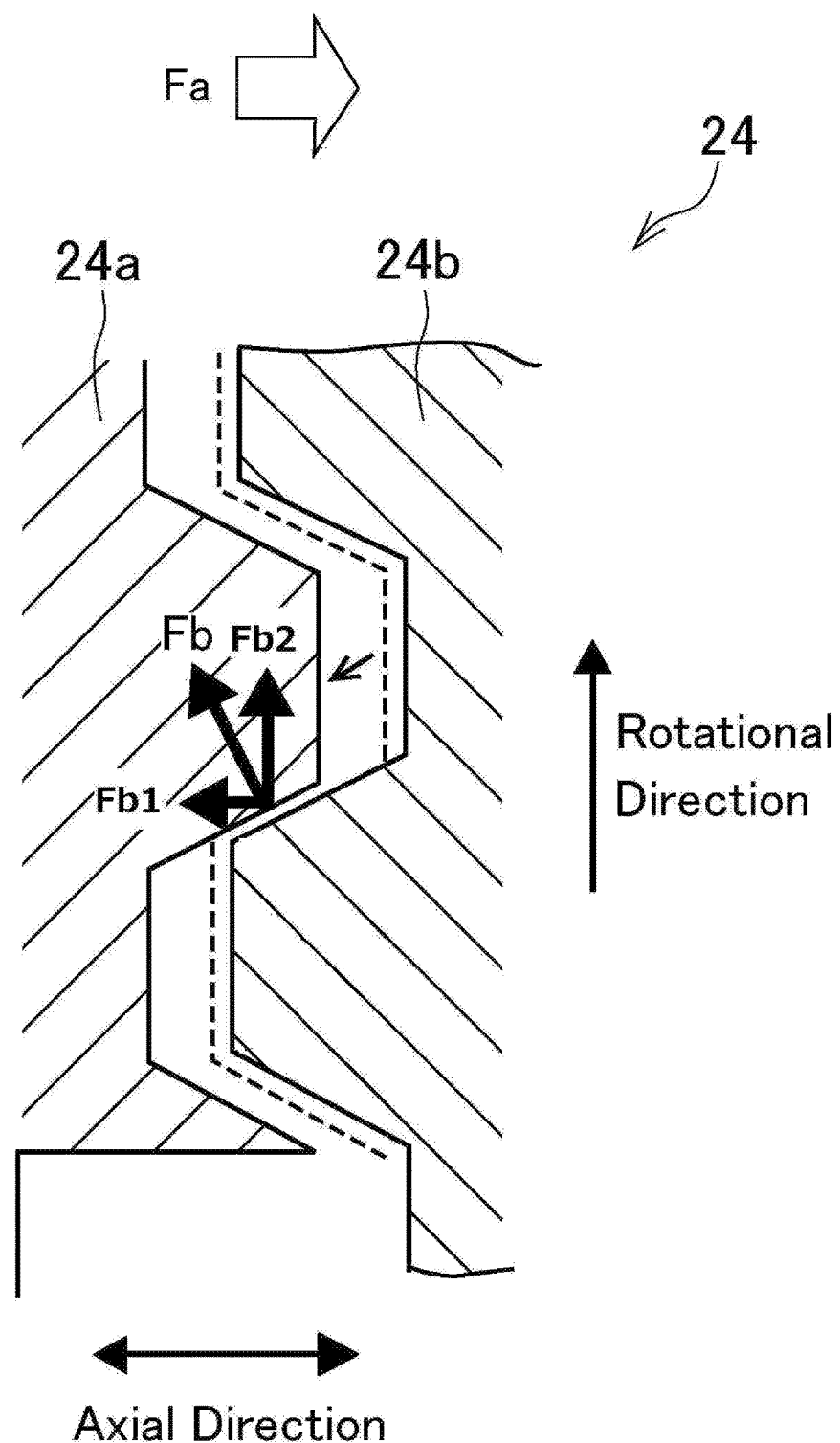
FIG. 3 is a cross-sectional view showing the cross-section of the clutch device along the IV-IV line in FIG. 2 in an enlarged scale.

As illustrated in FIG. 3, a tooth thickness of each of the reciprocating teeth 24a is individually reduced toward the rotary teeth 24b. That is, a cross-sectional shape of each of the reciprocating teeth 24a is trapezoidal. Likewise, a tooth thickness of each of the rotary teeth 24b is individually reduced toward the reciprocating teeth 24a. That is, a cross-sectional shape of each of the rotary teeth 24b is also trapezoidal. Thus, a tooth face of each of the reciprocating teeth 24a is individually inclined, and a tooth face of each of the rotary teeth 24b is individually inclined.

In the following descriptions, the direction to move the reciprocating member 24c toward the rotary member 24d (i.e., to the right side in FIG. 2) will be called the "engaging direction", and the direction to move the reciprocating member 24c away from the rotary member 24d (i.e., to the left side in FIG. 2) will be called the "disengaging direction".

The clutch device 23 is provided with an electromagnetic actuator (as will be simply called the "actuator" hereinafter) 26 that generates an electromagnetic attraction Fa to attract the reciprocating teeth 24a of the reciprocating member 24c toward the rotary teeth 24b of the rotary member 24d. The actuator 26 comprises an armature 26a, a yoke 26b, a return spring 26c and a coil 26d held in the yoke 26b.

In the transmission case 25, the armature 26a is disposed in the left side in FIG. 2, and the yoke 26b is disposed coaxially while being opposed to the armature 26a. The return spring 26c is interposed between the armature 26a and the yoke 26b to push the armature 26a in the direction away from the yoke 26b (i.e., in the disengaging direction). When the coil 26d is energized, the actuator 26 generates the electromagnetic attraction Fa so that the armature 26a is attracted to the yoke 26b while compressing the return spring 26c. Thus, the reciprocating teeth 24a of the reciprocating member 24c are engaged with the rotary teeth 24b of the rotary member 24d by increasing the current supplied to the coil 26d to increase the electromagnetic attraction Fa of the actuator 26 greater than an elastic pushing force of the of the return spring 26c. By contrast, the reciprocating teeth 24a of the reciprocating member 24c are disengaged from the rotary teeth 24b of the rotary member 24d by reducing the current supplied to the coil 26d to reduce the electromagnetic attraction Fa of the actuator 26 weaker than the elastic pushing force of the of the return spring 26c. Here, another actuator or other kind of elastic members may also be used instead of the return spring 26c to isolate the armature 26a away from the yoke 26b.

In other words, a magnetic field is created around the coil 26d by energizing the coil 26d thereby attracting the armature 26a toward the yoke 26b. Consequently, the reciprocating member 24c is pushed by the armature 26a in the engaging direction so that the reciprocating teeth 24a thereof are engaged with the rotary teeth 24b of the rotary member 24d. In this situation, the tooth face of each of the reciprocating teeth 24a is individually subjected to a torque of the rotary member 24d through the rotary teeth 24b, and a normal component of reaction force Fb against the torque of the rotary member 24d acts on the tooth face of each of the reciprocating teeth 24a as indicated in FIG. 3. Consequently, a component Fb1 of the normal component of reaction force Fb acts in the axial direction of the input shaft 4a, and a component Fb2 of the normal component of reaction force Fb acts in the rotational direction of the rotary member 24d.

In this situation, an engagement between the reciprocating teeth 24a of the reciprocating member 24c and the rotary teeth 24b of the rotary member 24d is maintained unless total force of the component Fb1 of the normal component of reaction force Fb and the pushing force of the return spring 26c overwhelms the electromagnetic attraction Fa of the actuator 26 and a frictional resistance at a contact site. That is, the engagement of the clutch device 23 is maintained to halt rotations of the input shaft 4a, the carrier 9 and the output shaft 1a as long as the engagement between the reciprocating teeth 24a of the reciprocating member 24c and the rotary teeth 24b of the rotary member 24d is maintained.

By contrast, when the total force of the component Fb1 of the normal component of reaction force Fb and the pushing force of the return spring 26c overwhelms the electromagnetic attraction Fa of the actuator 26 and the frictional resistance at the contact site, the reciprocating teeth 24a of the reciprocating member 24c is disengaged from the rotary teeth 24b of the rotary member 24d. Specifically, the tooth faces of the reciprocating teeth 24a are withdrawn away from the tooth faces of the rotary teeth 24b by an axial thrust, and consequently a torque transmission between the reciprocating member 24c and the rotary member 24d is interrupted. That is, when the torque greater than the upper limit value transmittable between the reciprocating teeth 24a and the rotary teeth 24b is applied to the rotary teeth 24b, a slippage is caused between the reciprocating teeth 24a and the rotary teeth 24b so that the reciprocating member 24c is withdrawn away from the rotary member 24d. Consequently, the clutch device 23 is disengaged, that is, the clutch device 23 serves as a torque limiter. In other words, when the torque greater than the upper limit value transmittable between the reciprocating teeth 24a and the rotary teeth 24b is applied to the rotary teeth 24b, the reciprocating teeth 24a are disengaged from the rotary teeth 24b to interrupt torque transmission therebetween. When the clutch device 23 is thus disengaged, if the electromagnetic attraction Fa of the actuator 26 is still greater than the pushing force of the return spring 26c, the reciprocating teeth 24a are immediately engaged with the rotary teeth 24b again. In this situation, if the torque of the rotary member 24d is still greater than the above-mentioned upper limit value, the reciprocating teeth 24a are immediately disengaged from the rotary teeth 24b again. In order to avoid such repetition of the engagement and disengagement between the reciprocating teeth 24a and the rotary teeth 24b (i.e., a ratchetting phenomenon), it is preferable to interrupt current supply to the coil 26d thereby eliminating the electromagnetic attraction Fa when the clutch device 23 is disengaged.

Thus, in the example shown in FIG. 2, the reciprocating member 24c is reciprocated by the actuator 26 to be engaged with the rotary member 24d. However, the rotary member 24d may also be reciprocated by the actuator 26 to be engaged with the reciprocating member 24c.

For example, an operating mode of the hybrid vehicle Ve may be selected from hybrid mode (to be abbreviated as the "HV mode" hereinafter) in which the hybrid vehicle Ve is powered by the engine 1, a dual-motor mode in which the hybrid vehicle Ve is powered by both of the first motor 2 and the second motor 3, and a single-motor mode in which the hybrid vehicle Ve is powered only by the second motor 3. In order to electrically control the hybrid vehicle Ve, the hybrid vehicle Ve is provided with an electronic control unit (to be abbreviated as the "ECU" hereinafter) 28 as a controller. The ECU 28 is composed mainly of a microcomputer that is configured to execute calculation based on data and maps installed in advance, and incident data transmitted thereto. For example, the incident data includes data about a position of an accelerator pedal, a wheel speed, a vehicle speed, a state of charge (to be abbreviated as the "SOC" hereinafter) of a battery (not shown), a travel distance of the reciprocating member 24c, a position of a shift lever, a temperatures of engine water, a temperature of engine oil and so on, and the map includes a map for shifting the operating mode. The ECU 28 transmits calculation results in the form of command signal such as: a command signal to stop or start the engine 1; torque commands to the first motor 2, the second motor 3 and the engine 1; a current command to the actuator 26, and so on. Optionally, a plurality of the ECU may be arranged in the hybrid vehicle according to need.

When starting the engine 1, the clutch device 23 is disengaged to allow the engine 1 to rotate. In this situation, even if the current supply to the coil 26d is stopped, the electromagnetic attraction Fa may not be eliminated immediately and hence the engagement between the reciprocating teeth 24a of the reciprocating member 24c and the rotary teeth 24b of the rotary member 24d may be maintained. Consequently, a response of the clutch device 23 to be disengaged to allow the engine 1 to rotate may be impaired when starting the engine 1. In order to avoid such disadvantage, the controller of the control system according to the embodiment applies torque of the first motor 2 to the rotary member 24d of the clutch device 23 when starting the engine 1 by the following procedure shown in FIG. 4.

Figure 4:
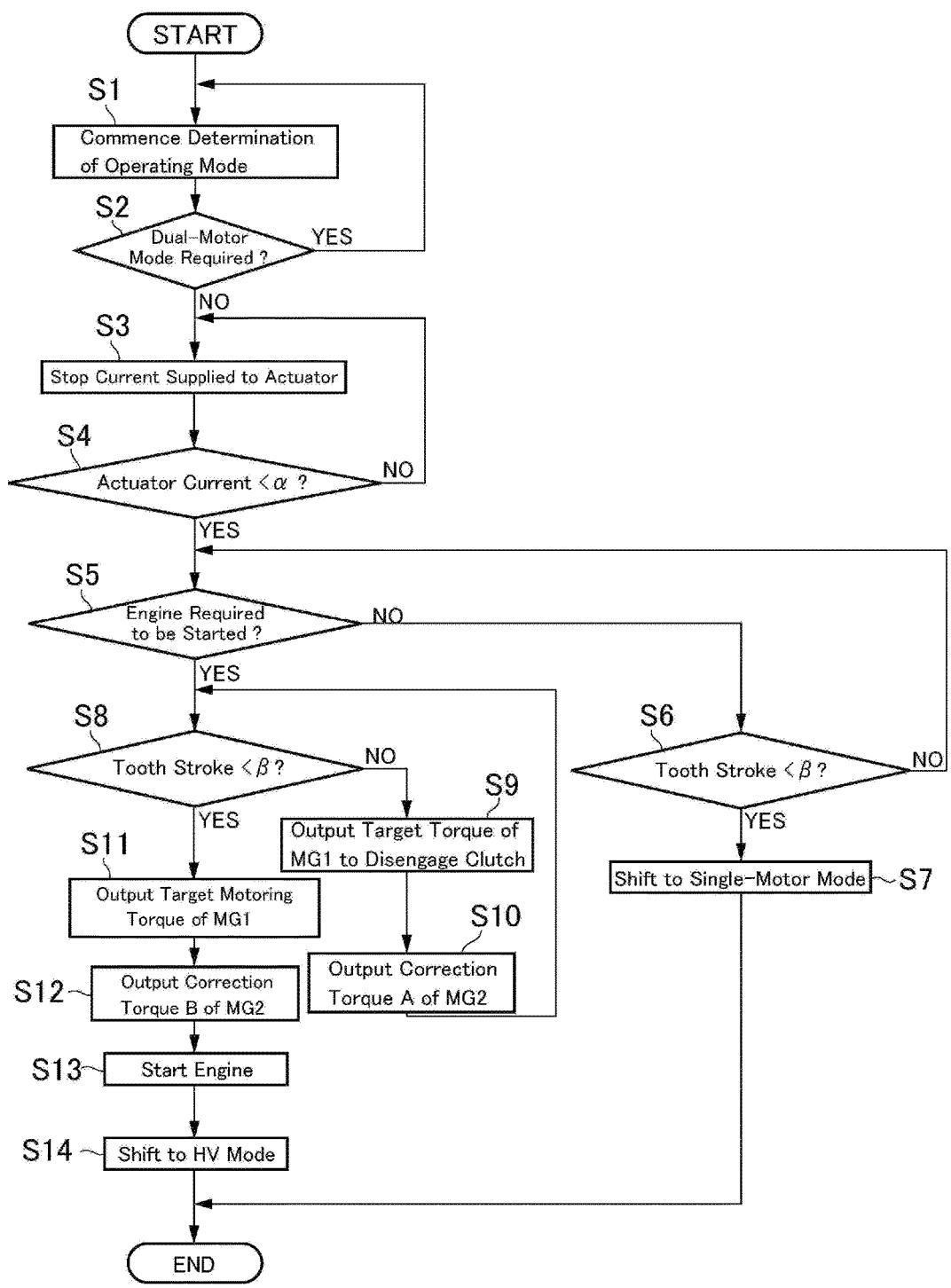
FIG. 4 is a flowchart showing one example of a routine executed by the control system according to the embodiment of the present disclosure.

The routine shown in FIG. 4 is executed during propulsion of the hybrid vehicle Ve in the dual-motor mode, or when the hybrid vehicle Ve is in Ready-on state in which the control system is turned on.

First of all, at step S1, a determination to shift the operating mode while starting the engine 1 is commenced. Such determination may be executed on the basis of the map and the program installed in the ECU 28. Then, it is determined at step S2 whether or not the dual-motor mode is required. If the dual-motor mode is required so that the answer of step S2 is YES, this means that the hybrid vehicle Ve is currently propelled in the dual-motor mode and hence the routine returns to step S1 to continue the dual-motor mode.

By contrast, if the dual-motor mode is no longer required so that the answer of step S2 is NO, the routine progresses to step S3 to stop the current supply to the coil 26d of the actuator 26. In this case, the operating mode of the hybrid vehicle Ve is to be shifted to the HV mode in which the engine 1 is activated, or the single-motor mode in which the hybrid vehicle Ve is powered only by the second motor 3. Then, it is determined at step S4 whether or not the current passing through the actuator 26 is reduced to a predetermined threshold value α or smaller than the threshold value α. Specifically, the threshold value α is set to substantially zero, but may be adjusted according to need. If the current passing through the actuator 26 is still greater than the threshold value α so that the answer of step S4 is NO, the routine returns to step S3.

By contrast, if the current passing through the actuator 26 is reduced to the threshold value α or smaller than the threshold value α so that the answer of step S4 is YES, the routine progresses to step S5 to determine whether or not the engine 1 is required to be started with reference to the map and program installed in the ECU 28. As described, the routine progresses from step S2 to the subsequent steps in the case that the operating mode of the hybrid vehicle Ve is to be shifted to the HV mode or the single-motor mode. At step S5, therefore, it is determined that the operating mode is to be shifted to the single-motor mode or to the HV mode. If the operating mode of the hybrid vehicle Ve is to be shifted to the single-motor mode in which the engine 1 is not required to be started so that the answer of step S5 is NO, the routine progresses to step S6 to determine whether or not a stroke (i.e., a travel distance) of the reciprocating teeth 24a from an original position as an axially furthest position from the rotary teeth 24b is smaller than a threshold value ß. Specifically, the reciprocating teeth 24a are situated at the original position when the reciprocating member 24c is pushed by the return spring 26c to the axially furthest position from the rotary member 24d. For example, the threshold value ß may be set to a distance between the original position and a position at which the reciprocating teeth 24a are brought into contact to the rotary teeth 24b in a torque transmittable manner, but may be adjusted according to need. If the travel distance of the reciprocating teeth 24a from the original position is equal to or greater than the threshold value ß, that is, if the reciprocating teeth 24a are in contact to the rotary teeth 24b so that the answer of step S6 is NO, the routine returns to step S5.

By contrast, if the travel distance of the reciprocating teeth 24a from the original position is smaller than the threshold value ß, that is, if the reciprocating teeth 24a are isolated away from the rotary teeth 24b so that the answer of step S6 is YES, the routine progresses to step S7 to shift the operating mode to the single-motor mode in which the hybrid vehicle Ve is powered only by the second motor 3, and then the routine is terminated. In this case, since the engine 1 is not required to be started, it is not necessary to improve the response of the clutch device 23 to be disengaged to allow the engine 1 to rotate. In this case, therefore, the reciprocating teeth 24a may be isolated away from the rotary teeth 24b only by the return spring 26c without generating torque by the first motor 2 or the second motor 3 to prevent reduction in the SOC level of the battery.

If the operating mode of the hybrid vehicle Ve is to be shifted to the HV mode in which the engine 1 is required to be started so that the answer of step S5 is YES, the routine progresses to step S8 to also determine whether or not the above-mentioned travel distance of the reciprocating teeth 24a is smaller than the threshold value ß. If the travel distance of the reciprocating teeth 24a from the original position is equal to or greater than the threshold value ß so that the answer of step S8 is NO, this means that the reciprocating teeth 24a are still in contact to the rotary teeth 24b. In this case, therefore, the routine progresses to step S9 to apply an output torque of the first motor 2 to the rotary member 24d of the clutch device 23. To this end, specifically, an output torque of the first motor 2 is adjusted to a target torque as a second target torque to disengage the clutch device 23.

In addition, the target torque of the first motor 2 to disengage the clutch device 23 may be adjusted in such a manner as to achieve a desired response of the clutch device 23 to be disengaged. Further, the target torque of the first motor 2 to disengage the clutch device 23 is greater than an after-mentioned first target torque to crank the engine 1.

As a result of applying the torque of the first motor 2 to the clutch device 23, a reaction against the torque of the first motor 2 may be transmitted to the driveshaft 5 and hence pulsation of torque of the drive wheel 6 may be caused. In order to suppress or damp such pulsation of the torque of the drive wheel 6, the routine progresses to step S10 to generate a correction torque A by the second motor 3 in such a manner as to cancel the output torque of the first motor 2 to disengage the clutch device 23. Then, the routine returns to step S8. Specifically, the correction torque A may be set as a target torque of the second motor 3 based on the target torque of the first motor 2 to disengage the clutch device 23, but the correction torque A may be adjusted based on an actual torque of the first motor 2 to disengage the clutch device 23.

By contrast, if the travel distance of the reciprocating teeth 24a from the original position is smaller than the threshold value ß so that the answer of step S8 is YES, the routine progresses to step S11 to generate the target torque of the first motor 2 to crank the engine 1. In this situation, the clutch device 23 is in disengagement, and a rotational speed of the engine 1 is increased by the cranking torque of the first motor 2. Then, the routine progresses to step S12 to generate a correction torque B by the second motor 3 in such a manner as to cancel the cranking torque of the first motor 2.

The engine 1 is started at step S13 when the rotational speed thereof reaches a self-sustaining speed, and the operating mode of the hybrid vehicle is shifted to the HV mode at step S14. Then, the routine is terminated.

Alternatively, in order to reduce a required time to raise the rotational speed of the engine 1 to the self-sustaining speed, the target torque of the first motor 2 to crank the engine 1 may be generated at step S9, and target torque of the first motor 2 to disengage the clutch device 23 may be generated at step S11. In this case, the torque of the first motor 2 is controlled in such a manner as to achieve the target torque to crank the engine 1 first, and then achieve the target torque to disengage the clutch device 23 that is greater than the target torque to crank the engine 1. In this case, therefore, the rotational speed of the engine may be raised to the self-sustaining speed promptly.

Figure 5:
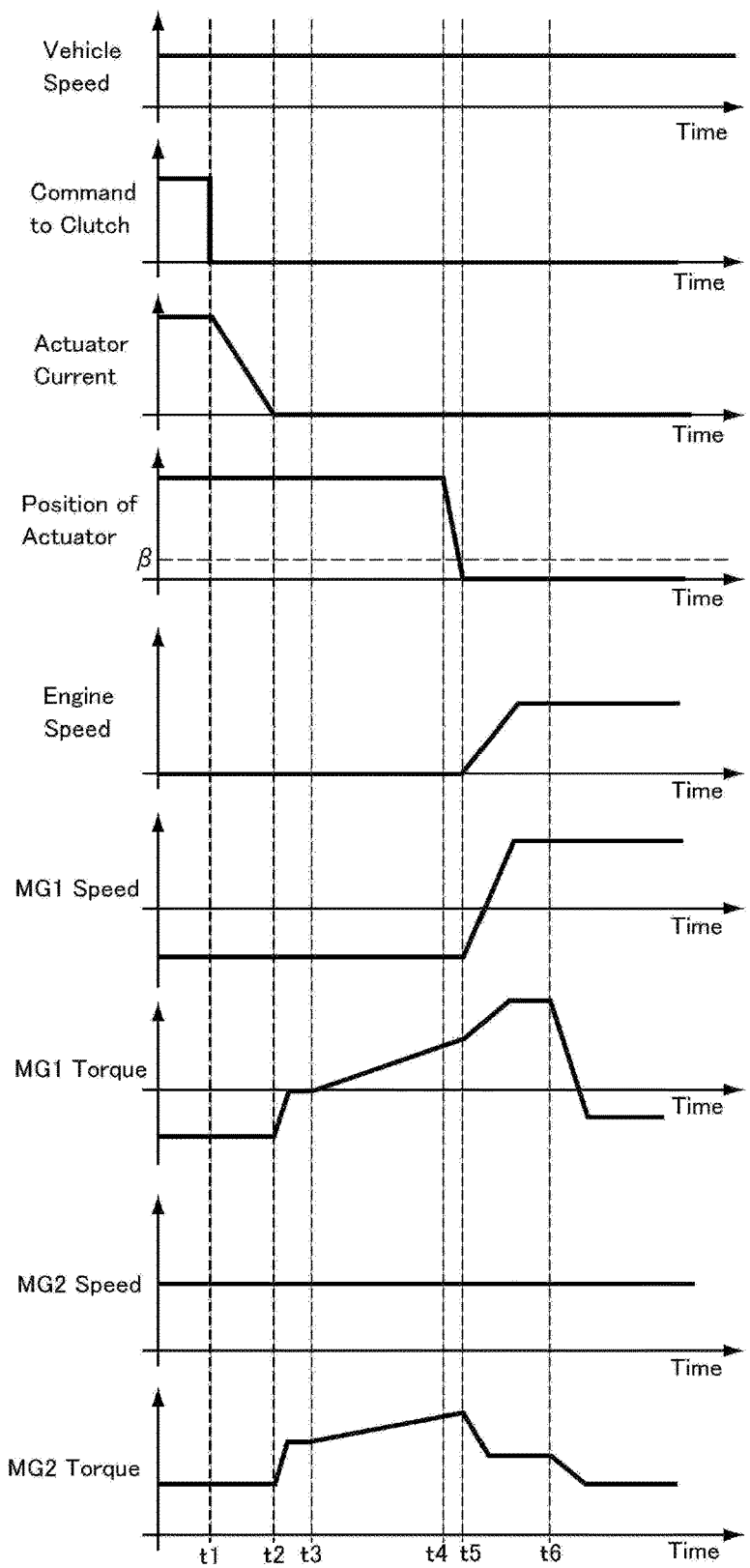
FIG. 5 is a time chart showing temporal changes in speeds of the rotary element and so on during execution of the routine shown in FIG. 4.

Changes in speeds and torques of the first motor 2 and the second motor 3, and changes in the command values and so on during execution of the routine shown in FIG. 4 are indicated in FIG. 5.

At point t1, the command signal to the clutch device 23 is switched from the command to engage the clutch device 23 to the command to disengage the clutch device 23, and a reduction of the current supply to actuator 26 is commenced.

Consequently, at point t2, the current value of the actuator 26 is reduced to substantially zero. In this situation, a travel distance (i.e., a stroke) of the reciprocating teeth 24a of the reciprocating member 24c is still equal to greater than the threshold value ß. That is, the reciprocating teeth 24a of the reciprocating member 24c are still engaged with the rotary teeth 24b of the rotary member 24d. The first motor 2 generates counter torque (i.e., in the opposite direction to the engine torque) prior to point t2, and such torque generation of the first motor 2 is stopped at point t2. On the other hand, the second motor 3 generates forward torque (i.e., in the same direction as the engine torque) to maintain a rotational speed of the drive wheel 6.

At point t3, the travel distance of the reciprocating teeth 24a has not yet been changed. This means that the reciprocating teeth 24a are still engaged with the rotary teeth 24b by the electromagnetic attraction Fa. In this situation, the condition to start the engine 1 is satisfied, and the first motor 2 starts generating the target torque to disengage the clutch device 23 in the forward direction. At the same time, the second motor 3 also generates a torque to counteract to the torque of the first motor 2.

At point t4, the total force of the component Fb1 in the axial direction and the pushing force of the return spring 26c overwhelms the electromagnetic attraction Fa of the actuator 26 and the frictional resistance at the contact site. Consequently, the reciprocating teeth 24a start being withdrawn from the rotary teeth 24b to disengage the clutch device 23.

The reciprocating teeth 24a returned to the original position at point t5 so that the rotational speed of the engine 1 starts increasing. As described, the torque required to crank the engine 1 is different from the torque required to disengage the clutch device 23. After point t5, therefore, the output torque of the first motor 2 is changed at a different rate from that between point t3 and the point t4.

The rotational speed of the engine 1 is raised to the self-sustaining speed just before point t6, and hence the cranking (or motoring) of the engine 1 is completed. Consequently, the torques of the first motor 2 and the second motor 3 are reduced from point t6.

Although the above exemplary embodiments of the present application have been described, it will be understood by those skilled in the art that the present application should not be limited to the described exemplary embodiments, and various changes and modifications can be made within the spirit and scope of the present application.

For example, the output torque of the first motor 2 may be changed at a same rate when disengaging the clutch device 23 and when cranking of the engine 1. Specifically, the cranking of the engine 1 may be executed by generating the target torque to disengage the clutch device 23 as described above. In this case, the rotational speed of the engine may be raised to the self-sustaining speed promptly.

In addition, the clutch device 23 may be disengaged by applying the counter torque of the first motor 2 thereto. In this case, the axial component of force is also applied to the reciprocating teeth 24a in the direction away from the rotary teeth 24b of the rotary member 24d.

What is claimed is:

1. A control system for a hybrid vehicle, comprising:
  a power distribution device that performs a differential action among an input element, an output element and a reaction element;
  an engine that is connected to the input element;
  a first motor that is connected to the reaction element;
  a second motor that is connected to the output element;
  a clutch device including a brake member that selectively stops a rotation of the input element; and
  a controller that controls the engine, the first motor, the second motor and the clutch device;
  wherein the clutch device further includes
    a reciprocating member,
    a rotary member that is arranged coaxially with the reciprocating member,
    reciprocating teeth formed on the reciprocating member in which a thickness of each tooth is individually reduced toward the rotary member,
    rotary teeth formed on the rotary member in which a thickness of each tooth is individually reduced toward the reciprocating member, and
    an electromagnetic actuator that generates an electromagnetic attraction to attract the reciprocating teeth toward the rotary teeth;
  wherein the controller is configured to:
    crank the engine by the first motor;
    turn off the electromagnetic actuator to eliminate the electromagnetic attraction thereby allowing the engine to be started; and
    apply a torque of the first motor to the clutch device after the electromagnetic actuator is turned off thereby disengaging the reciprocating teeth from the rotary teeth.

2. The control system for the hybrid vehicle as claimed in claim 1, wherein the controller is further configured to apply the torque of the first motor to the clutch device in a same direction as a torque of the engine.

3. The control system for the hybrid vehicle as claimed in claim 1,
  wherein the reciprocating member is returned to an original position at which the reciprocating teeth are disengaged from the rotary teeth when the electromagnetic actuator is turned off, and the reciprocating member is attracted to the rotary teeth to be engaged therewith by the electromagnetic attraction of the electromagnetic actuator, and
  wherein the controller is further configured to change the torque of the first motor depending on a travel distance of the reciprocating teeth from the original position toward the rotary teeth in a case that the electromagnetic actuator has been turned off and the condition to start the engine is satisfied.

4. The control system for the hybrid vehicle as claimed in claim 3, wherein the controller is further configured to:
  select a target value of the torque of the first motor from at least a first target torque to crank the engine, and a second target torque to be applied to the clutch device to disengage the clutch device that is greater than the first target torque; and
  change the torque of the first motor to achieve the first target torque when the travel distance of the reciprocating teeth from the original position toward the rotary teeth is smaller than the threshold value, and to achieve the second target torque when the travel distance of the reciprocating teeth from the original position toward the rotary teeth is equal to or greater than the threshold value.

5. The control system for the hybrid vehicle as claimed in claim 1, wherein the electromagnetic actuator includes:
  a coil that generates an electromagnetic attraction when energized;
  a yoke holding the coil therein;
  an armature that is disposed coaxially with the yoke to be electromagnetically attracted to the yoke by the electromagnetic attraction generated by the coil; and
  a return spring that pushes the armature away from the yoke.

6. The control system for the hybrid vehicle as claimed in claim 1, wherein the controller is further configured to generate a torque by the second motor in a direction to cancel the torque of the first motor.

* * * * *